(12) United States Patent
Ganji et al.

(10) Patent No.: US 9,893,997 B2
(45) Date of Patent: Feb. 13, 2018

(54) SYSTEM AND METHOD FOR CREATING SESSION ENTRY

(71) Applicant: FREESCALE SEMICONDUCTOR, INC., Austin, TX (US)

(72) Inventors: Kumara Swamy Ganji, Hyderabad (IN); Patel Ravikanth Reddy, Hyderabad (IN)

(73) Assignee: NXP USA,INC., Austin, TX (US)

( * ) Notice: Subject to any disclaimer, the term of this patent is extended or adjusted under 35 U.S.C. 154(b) by 148 days.

(21) Appl. No.: 15/093,657

(22) Filed: Apr. 7, 2016

(65) Prior Publication Data

US 2017/0295097 A1    Oct. 12, 2017

(51) Int. Cl.
*H04L 29/12* (2006.01)
*H04L 12/741* (2013.01)
*H04L 12/755* (2013.01)
*H04L 12/823* (2013.01)

(52) U.S. Cl.
CPC .......... *H04L 45/745* (2013.01); *H04L 45/021* (2013.01); *H04L 47/32* (2013.01); *H04L 61/2007* (2013.01)

(58) Field of Classification Search
CPC ..... H04L 45/021; H04L 45/745; H04L 47/32; H04L 61/2007; H04L 29/06095; H04L 29/0653; H04L 45/74; H04L 49/3009; H04L 49/309
USPC ...................................................... 370/392
See application file for complete search history.

(56) References Cited

U.S. PATENT DOCUMENTS

| 6,591,302 | B2 | 7/2003 | Boucher et al. | |
|---|---|---|---|---|
| 8,243,608 | B2 | 8/2012 | Tausanovitch et al. | |
| 2009/0003354 | A1* | 1/2009 | Sreejith | H04L 47/10 370/396 |
| 2012/0057595 | A1* | 3/2012 | Awano | H04L 12/4633 370/392 |
| 2013/0074183 | A1* | 3/2013 | Yoon | G06F 21/00 726/22 |
| 2013/0086414 | A1* | 4/2013 | Hammam | G06F 11/2005 714/4.11 |
| 2014/0215598 | A1* | 7/2014 | Ke | H04L 63/0272 726/12 |

(Continued)

FOREIGN PATENT DOCUMENTS

WO    WO 2014177097 A1 *  11/2014    ......... H04L 12/6418

*Primary Examiner* — Chi H Pham
*Assistant Examiner* — Robert Lopata
(74) *Attorney, Agent, or Firm* — Charles E. Bergere

(57) ABSTRACT

A system for creating a session entry and forwarding an IP packet includes memories that store session and session template tables, and first and second processors in communication with the memories. When the first processor receives the IP packet, it determines whether the session table includes a session entry corresponding to the IP packet. If the session table does not include the session entry, the first processor determines whether the session template table includes a session template entry corresponding to the IP packet. The first processor generates the session entry using the session template entry and the IP packet. If the session template table does not include the session template entry, the first processor forwards the IP packet to the second processor, which generates the session template entry and the session entry.

18 Claims, 4 Drawing Sheets

(56) References Cited

U.S. PATENT DOCUMENTS

2014/0347993 A1* 11/2014 Hammam ............... H04L 67/10
                                                            370/235
2015/0046486 A1   2/2015 Asaad et al.
2016/0330045 A1* 11/2016 Tang ..................... H04L 12/462
2017/0195254 A1*  7/2017 Pham ..................... H04L 49/25

* cited by examiner

FIG. 2

| Source IP | Destination IP | Destination port | Protocol information | Timeout | Action | Maximum connection |

| Source IP | Destination IP | Destination port | Protocol information | Timeout | Maximum connection |

302, 304, 306, 308, 310, 312

128

SYSTEM AND METHOD FOR CREATING SESSION ENTRY

BACKGROUND

The present invention relates generally to communication networks, and, more particularly, to a system for creating a session entry and forwarding Internet protocol (IP) packets based on the session entry.

A communication network typically includes multiple digital systems such as gateways, switches, access points and base stations that manage transmission of IP packets over the communication network. In most communication networks, the operation of forwarding IP packets (also referred to as "data plane") is de-coupled from the operation of processing the IP packets (also referred to as "control plane") to optimize IP packet transmission.

A communication system includes a control plane for processing IP packets and a data plane for forwarding the IP packets based on a session entry. The data plane and the control plane include data plane and control plane processors, respectively. The data plane further includes a memory that stores a session table including session entries. When the data plane processor receives a first IP packet, it scans the session table for a first session entry corresponding to the first IP packet. The data plane processor matches a first set of fields of the first IP packet with a corresponding set of fields of the first session entry, and then forwards the first IP packet based on the first session entry. If the session table does not include the first session entry, the first processor forwards the first IP packet to the control plane processor. The control plane processor then processes the first IP packet and generates the first session entry. The control plane processor also stores the first session entry in the session table so that the data plane processor can forward the first IP packet based on the first session entry.

Similarly, the data plane processor receives a second IP packet including a second set of fields. All fields except the source port field of the second set of fields match those in the first set of fields. The data plane processor scans the session table for a second session entry corresponding to the second IP packet. If the session table does not include the second session entry, the data plane processor forwards the second IP packet to the control plane processor for generating the second session entry in the session table. Thus, forwarding the second IP packet to the control plane processor to create the second session entry increases the time required to forward the second IP packet. Further, it decreases the number of sessions created by the system per second (also known as a "connection rate").

It would be advantageous to have a communication system that improves on the time required to forward IP packets and the connection rate.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

FIG. 2 illustrates a structure of a session template entry in accordance with an embodiment of the present invention;

FIG. 3 illustrates a structure of a connection template rule entry in accordance with an embodiment of the present invention.

DETAILED DESCRIPTION

Figure 1:
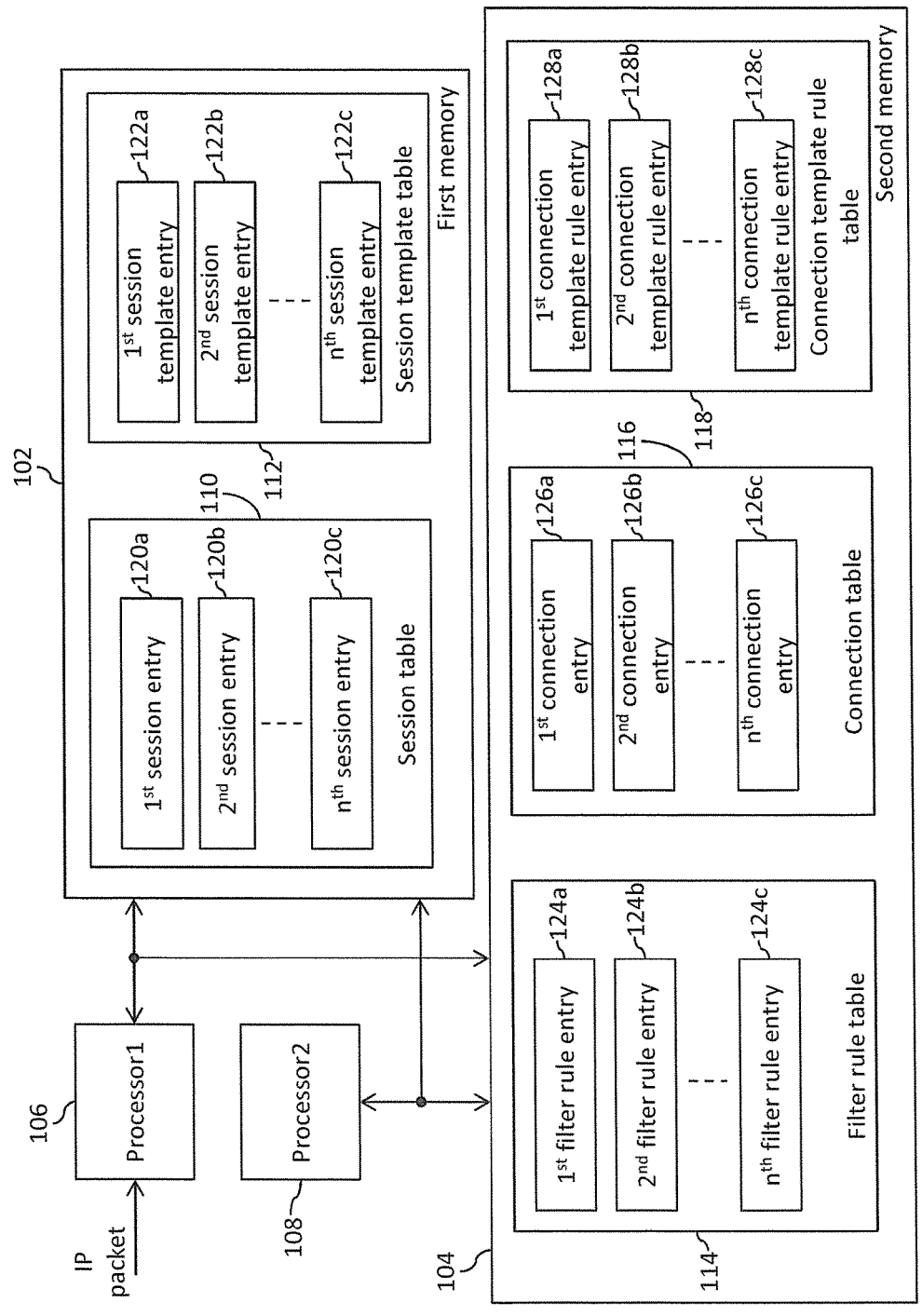
FIG. 1 is a schematic block diagram of a system that creates a session entry in a session table and forwards an IP packet based on the session entry in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a system for creating a session entry corresponding to an IP packet and forwarding the IP packet based on the corresponding session entries is provided. The system includes a first memory that stores session and session template tables. The system further includes a first processor that is in communication with the first memory. The session table and the session template table include session entries and session template entries, respectively. The first processor receives an IP packet and determines whether the session table includes a session entry corresponding to the IP packet. The first processor determines whether the session template table includes a session template entry corresponding to the IP packet when the session table does not include the session entry. The first processor generates the session entry based on the IP packet and the session template entry when the session template table includes the session template entry. The first processor stores the session entry in the session table and forwards the IP packet based on the session entry.

In another embodiment of the present invention, a method for creating a session entry corresponding to an Internet protocol (IP) packet and forwarding the IP packet based on the corresponding session entry by a system is provided. The system includes a first memory that stores a session table and a session template table. The session table and the session template table include session entries and session template entries, respectively. The method comprises receiving the IP packet and determining whether the session table includes a session entry corresponding to the IP packet. The method further comprises determining whether the session template table includes a session template entry corresponding to the IP packet when the session table does not include the session entry corresponding to the IP packet. The method further comprises generating the session entry based on the IP packet and the session template entry when the session template table includes the session template entry. The method further comprises storing the session entry in the session table and forwarding the IP packet based on the session entry.

Various embodiments of the present invention provide a system for creating session entries and forwarding IP packets based on the corresponding session entries. The system includes first and second memories that store session and session template tables, and connection and connection template rule tables, respectively. The system also includes first and second processors in communication with the first and second memories. When the first processor receives an IP packet, the first processor determines whether the session table includes a session entry corresponding to the IP packet. If the first processor determines that the session table includes the session entry corresponding to the IP packet, the first processor forwards the IP packet in a communication network based on the session entry. If the first processor determines that the session table does not include the session entry, the first processor determines whether the session template table includes a session template entry corresponding to the IP packet. If the session template table includes the corresponding session template entry, the first processor generates the session entry using the session template entry and stores the session entry in the session table. The first processor forwards the IP packet for further processing based on the session entry.

However, if the first processor determines that the session template table does not include the session template entry, the first processor forwards the IP packet to the second processor. The second processor generates the session and session template entries corresponding to the IP packet using a connection entry of the connection table and stores the session entry in the session table. Further, the second processor stores the session template entry in the session template table when the connection template rule table includes a connection template rule entry corresponding to the IP packet.

The first processor forwards a subsequent IP packet based on the session template entry when all fields except the source port field of the subsequent IP packet matches the corresponding fields of the IP packet. The first processor does not forward the subsequent IP packets to the second processor for generating the session entry. The system avoids forwarding the IP packets with similar sets of fields (except the source port field) to the second processor. Thus, the overall time required to forward the IP packets is reduced, thereby improving the connection rate of the system.

Further, to enforce security in a communication network, the second processor discards unwanted IP packets based on predefined rules. The predefined rules decide whether to allow or discard the IP packets in the communication network to prevent eavesdropping, tampering, and message forgery. The session template entry includes an action field that is updated based on the predefined rules. Thus, the action field of the session template entry is used to discard the unwanted IP packets by the first processor.

Referring now to FIG. 1, a schematic block diagram of a system 100 in accordance with an embodiment of the present invention is shown. The system 100 is a part of a communication network (not shown) which includes gateways, switches, access points, and base stations. The system 100 decouples the functionality of forwarding IP packets (also referred to as "data plane") from the functionality of processing the IP packets (also referred to as "control plane") to optimize IP packet transmission. The data plane and the control plane of the system 100 include first and second memories 102 and 104, respectively. Examples of the first and second memories 102 and 104 include static random-access memories (SRAMs) and dynamic RAMs (DRAMs). The data plane and control plane further include first and second processors 106 and 108, respectively, in communication with the first and second memories 102 and 104. The first memory 102 stores a session table 110 and a session template table 112. The second memory 104 stores a filter rule table 114, a connection table 116 and a connection template rule table 118.

The first processor 106 receives Internet protocol (IP) packets. The session table 110 includes multiple session entries 120 including first through third session entries 120a-120c. The session template table 112 includes multiple session template entries 122 including first through third session template entries 122a-122c. The filter rule table 114 includes multiple filter rule entries 124 including first through third filter rule entries 124a-124c. The connection table 116 includes multiple connection entries 126 including first through third connection entries 126a-126c. The connection entries 126 are the session entries 120. The connection template rule table 118 includes multiple connection template rule entries 128 including first through third connection template rule entries 128a-128c.

The first processor 106 forwards the IP packets in the communication network based on the session entries 120. The first processor 106 generates the session entries 120 based on the session template entries 122 when the session table 110 does not include the session entries 120 corresponding to the IP packets. The method of generating the session entries 120 by at least one of the first and second processors 106 and 108 is referred to as creating a session.

The filter rule entries 124 include rules that grant permission to the second processor 108 to store a connection entry 126 as a session entry 120 in the session table 110. In an example, the filter rule entry 124 includes a predefined value (80) of the destination port field of an IP packet. Thus, when the value of the destination port field of the IP packet is equal to 80, the second processor 108 stores the connection entry 126 as the session entry 120 in the session table 110.

Similarly, the connection template rule entries 128 include rules that grant permission to the second processor 108 to store a session template entry 122 in the session template table 112. In an example, the connection template rule includes a predefined value (80) of the destination port field of the IP packet. Thus, when the value of the destination port field of the IP packet is equal to 80, the second processor 108 stores the session template entry 122 in the session template table 112.

Each IP packet includes a first set of fields. The first set of fields includes a source IP address field, a destination IP address field, a source port field, a destination port field, and a protocol information field. Each connection template rule entry 128 includes a second set of fields and each session template entry 122 includes a third set of fields.

Referring now to FIG. 2, a structure of a session template entry 122 in accordance with an embodiment of the present invention is shown. The third set of fields includes a source IP address field 202, a destination IP address field 204, a destination port field 206, a protocol information field 208, a timeout field 210, an action field 212, and a maximum connection field 214.

The timeout field 210 indicates the maximum time interval for which the first processor 106 can use the session template entry 122 to generate the corresponding session entries 120 before deleting the session template entry 122 from the session template table 112. The first processor 106 deletes the session template entry 122 from the session template table 112 when a value of the timeout field 210 exceeds a first threshold value. In an embodiment, the value of the timeout field 210 is configured by a user. However, if the value of the timeout field 210 is not configured by the user, the first processor 106 loads a default value.

The action field 212 indicates whether the first processor 106 should generate the session entry 120 based on the session template entry 122 (i.e., forward or discard the IP packet). A default value of the action field 212 is indicative of forwarding the IP packet. The maximum connection field 214 indicates a maximum count of the session entries 120 which can be generated using the corresponding session template entry 122 before the second processor 108 deletes the session template entry 122. In an embodiment, the first processor 106 deletes the session template entry 122 from the session template table 112 when a value of the maximum connection field 214 exceeds a second threshold value. The source IP address field 202, the destination IP address field 204, the destination port field 206, and the protocol information field 208 are well known in the art.

Referring now to FIG. 3, a structure of a connection template rule entry 128 in accordance with an embodiment of the present invention is shown. The second set of fields includes a source IP address field 302, a destination IP address field 304, a destination port field 306, a protocol information field 308, a timeout field 310, and a maximum connection field 312.

The timeout field 310 and the maximum connection field 312 are structurally and functionally similar to the timeout field 210 and the maximum connection field 214, respectively. The second processor 108 replaces values of the timeout field 210 and the maximum connection field 214 with values of the timeout field 310 and the maximum connection field 312, respectively, when the connection template rule table 118 includes the connection template rule entry 128 corresponding to a received IP packet. The source IP address field 302, the destination IP address field 304, the destination port field 306, and the protocol information field 308 are well known in the art.

In operation, the first processor 106 receives an IP packet. In an embodiment, the first session entry 120a, the first session template entry 122a, the first filter rule entry 124a, and the first connection entry 126a correspond to the IP packet. When the first processor 106 receives the IP packet, the first processor 106 determines whether the session table 110 includes the first session entry 120a. If the first processor 106 determines that the session table 110 includes the first session entry 120a, the first processor 106 forwards the IP packet in the communication network based on the first session entry 120a. However, if the session table 110 does not include the first session entry 120a, the first processor 106 determines whether the session template table 112 includes the first session template entry 122a.

The first processor 106 identifies the first session template entry 122a by matching at least one field of the third set of fields of the first session template entry 122a with the corresponding fields of the first set of fields. In the presently preferred embodiment, the first processor 106 identifies the first session template entry 122a by matching the source IP address field, the destination IP address field, the destination port field, and the protocol information field of the IP packet with the source IP address field 202, the destination IP address field 204, the destination port field 208, and the protocol information field 210 of the first session template entry 122a, respectively.

If the session template table 112 includes the first session template entry 122a, the first processor 106 generates the first session entry 120a based on the IP packet and the first session template entry 122a. The first processor 106 concatenates at least one field of the third set of fields with the source port field of the first set of fields to generate the first session entry 120a. In the presently preferred embodiment, the first session entry 120a is generated by concatenating the source IP field 202, the destination IP field 204, the destination port field 206, and the protocol information field 208 with the source port field of the first set of fields. The first processor 106 forwards the IP packet based on the first session entry 120a.

In another embodiment, the session template table 112 stores multiple session template entries 122 corresponding to the IP packet. The first session template entry 122a of the multiple session template entries 122 has the highest priority. Thus, the first processor 106 uses the first session template entry 122a to create the first session entry 120a.

If the session template table 112 does not include the first session template entry 122a, the first processor 106 forwards the IP packet to the second processor 108 for further processing. The second processor 108 validates the IP packet. In an embodiment, the second processor 108 performs an integrity check on the IP packet to validate the IP packet. The second processor 108 determines whether the filter rule table 114 includes the first filter rule entry 124a corresponding to the IP packet in the filter rule table 114.

If the second processor 108 determines that the filter rule table 114 does not include the first filter rule entry 124a corresponding to the IP packet, the second processor 108 discards the IP packet. It will be understood by a person skilled in the art that an unwanted IP packet does not have the corresponding filter rule entry 124 in the filter rule table 114. Further, if the second processor 108 determines that the filter rule table 114 includes the first filter rule entry 124a, the second processor 108 generates and stores the first connection entry 126a in the connection table 116. Further, the second processor 108 stores the first connection entry 126a as the first session entry 120a in the session table 110.

Simultaneously, the second processor 108 determines whether the connection template rule table 118 includes the first connection template rule entry 128a corresponding to the IP packet. The second processor 108 identifies the first connection template rule entry 128a by matching at least one field of the second set of fields with the corresponding fields of the first set of fields. In the presently preferred embodiment, the second processor 108 identifies the first connection template rule entry 128a by matching the destination port field and the protocol information field of the IP packet with the destination port field 306 and the protocol information field 308, respectively.

If the connection template rule table 118 includes the first connection template rule entry 128a, the second processor 108 generates the first session template entry 122a. In the presently preferred embodiment, the second processor 108 generates the first session template entry 122a by replacing the values of the source IP field 202, the destination IP field 204, the destination port field 206, and the protocol information field 208 with the values of the source IP field, the destination IP field, the destination port field, and the protocol information field of the first set of fields, respectively. Further, the second processor 108 replaces the values of the timeout field 210 and the maximum connection field 214 with the values of the timeout field 310 and the maximum connection field 312, respectively. The second processor 108 further stores the first session template entry 122a in the session template table 112. The first processor 106 forwards the IP packet to forwarding tables such as routing table, address Resolution Protocol (ARP) table, and the like based on the first session entry 120a.

In another embodiment, the connection template rule table 118 stores multiple connection template rule entries 128 corresponding to the IP packet. The first connection template rule entry 128a of the multiple connection template rule entries 128 has the highest priority. Thus, the second processor 108 uses the first connection template rule entry 128a to generate and store the first session template entry 122a in the session template table 112.

If the connection template rule table 118 does not include the first connection template rule entry 128a, the second processor 108 does not generate and store the first session template entry 122a in the session template table 112.

When the first processor 106 receives an IP packet subsequent to the received IP packet, the first processor 106 forwards the subsequent IP packet based on the first session template entry 122a when all fields except the source port field of the subsequent IP packet matches the corresponding fields of the IP packet. The first processor 106 does not forward the subsequent IP packet to the second processor 108 for generating the session entry 120 corresponding to the subsequent IP packet. The system 100 avoids forwarding the IP packets with similar sets of fields (except the source port field) to the second processor 108 by creating the session entry 120 using the session template entry 122 in the data plane. Thus, the overall time required to forward the IP packets is reduced, thereby improving the connection rate of the system 100. Example of the system 100 includes a digital system that creates the session entry using at least one of a Hypertext Transfer Protocol (HTTP) and a HTTP secure (HTTPS) protocol.

As the second processor 108 discards the unwanted IP packet in the control plane using the filter rule entry 124, the system 100 provides security to the communication network. Further, when the second processor 108 receives an unwanted IP packet, the second processor 108 generates the session template entry 122 corresponding to the unwanted IP packet with a value of the action field 212 indicative of discarding the IP packets. Thus, when the first processor 106 receives a stream of similar unwanted IP packets, the first processor 106 discards the stream of similar unwanted IP packets in the data plane itself by using the action field 212. Hence, the first processor 106 provides security to the communication network using the session template entry 122 without forwarding the unwanted IP packet to the second processor 108.

Figure 4A:
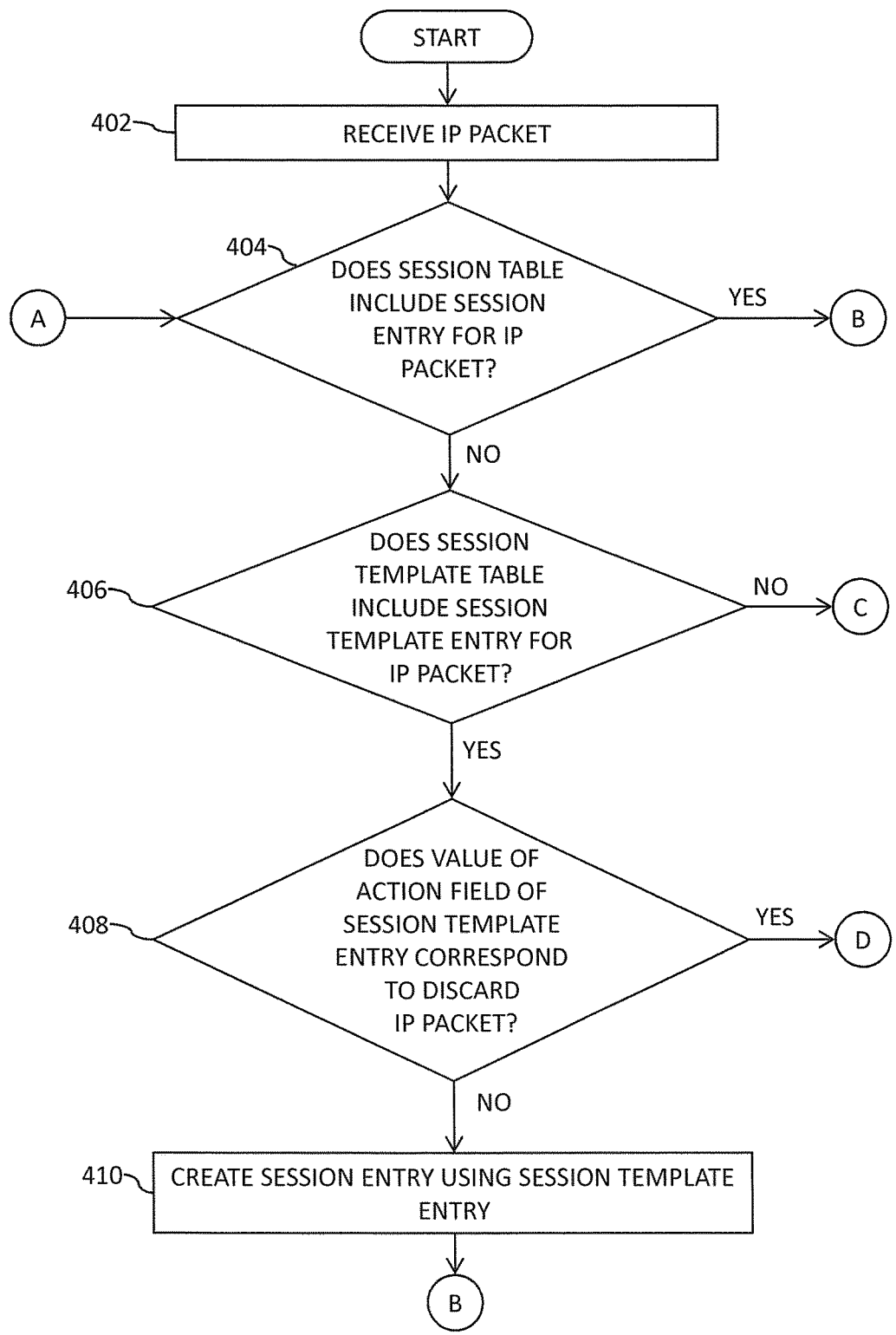
FIGS. 4A-4C are a flow chart of a method for creating a session entry in a session table and forwarding an IP packet based on the session entry in accordance with an embodiment of the present invention.
Figure 4B:
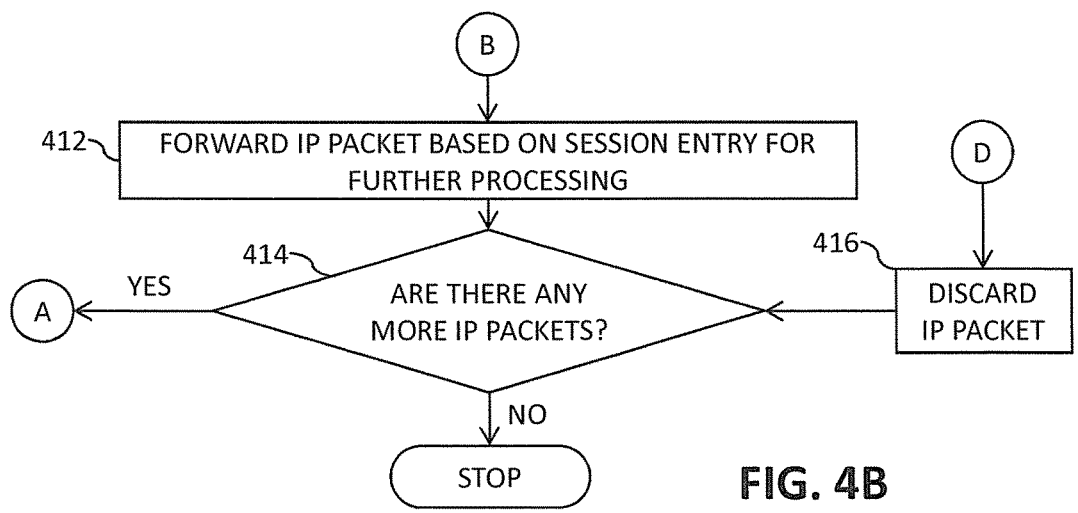
Figure 4C:
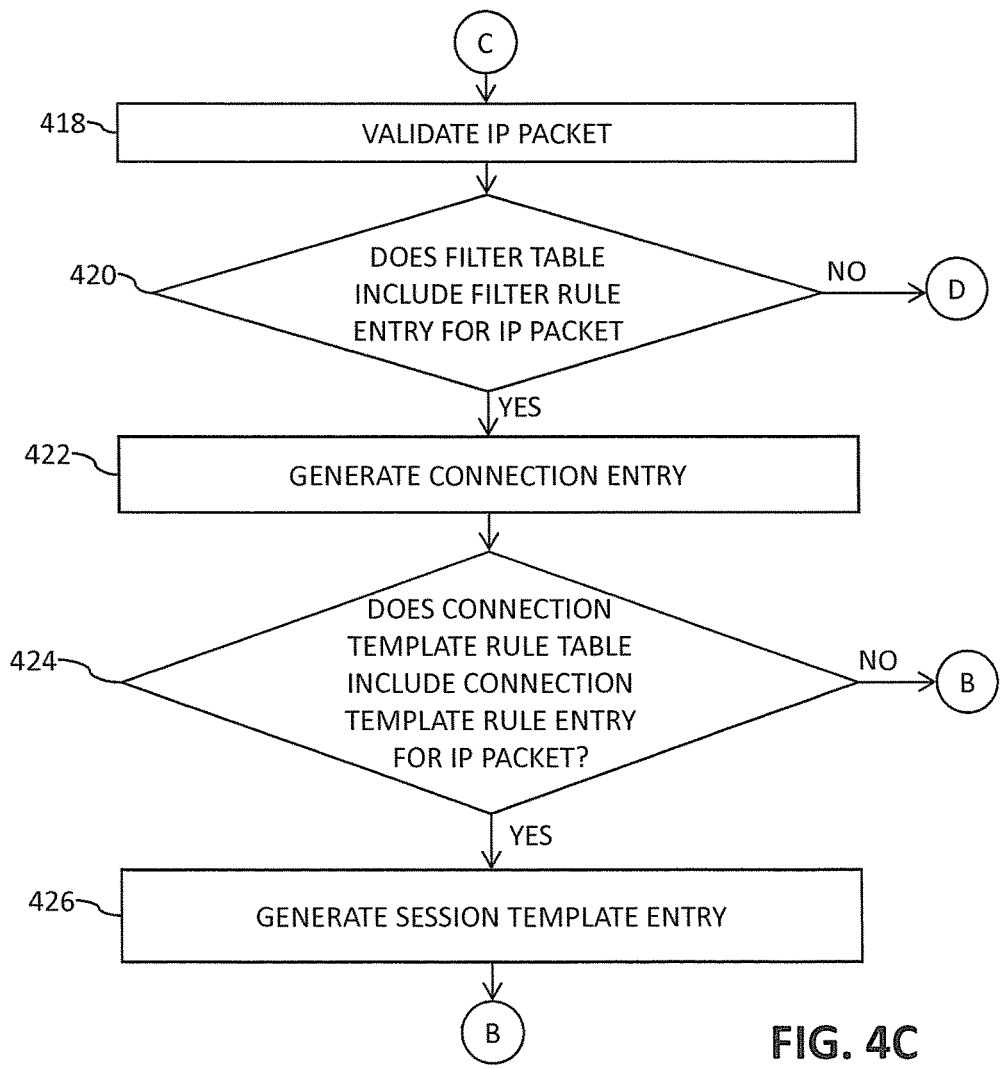

Referring now to FIGS. 4A-4C, a flowchart illustrating a method for creating session entries and forwarding IP packets based on the corresponding session entries in accordance with an embodiment of the present invention is shown. At step 402, the first processor 106 receives the IP packet. At step 404, the first processor 106 determines whether the session table 110 includes the first session entry 120a corresponding to the IP packet. If, at step 404, the first processor 106 determines that the session table 110 does not include the first session entry 120a, the first processor 106 executes step 406. At step 406, the first processor 106 determines whether the session template table 112 includes the first session template entry 122a corresponding to the IP packet. If, at step 406, the first processor 106 determines that the session template table 112 includes the first session template entry 122a, the first processor 106 executes step 408. At step 408, the first processor 106 determines whether the action field 212 of the third set of fields indicates that the IP packet is to be discarded. If, at step 408, the first processor 106 determines that the action field 212 does not indicate that the IP packet is to be discarded, the first processor 106 executes step 410. At step 410, the first processor 106 generates the first session entry 120a using the first session template entry 122a.

The first processor 106 then executes step 412. Further, if, at step 404, the first processor 106 determines that the session table 110 includes the first session entry 120a, the first processor 106 executes step 412. At step 412, the first processor 106 forwards the IP packet based on the first session entry 120a. At step 414, the first processor 106 determines whether there are more IP packets to be forwarded. If, at step 414, the first processor 106 determines that there are more IP packets to be forwarded, the first processor 106 executes step 404. Moreover, if at step 408, the first processor 106 determines that the action field 212 indicates that the IP packet is to be discarded, the first processor 106 executes step 416. At step 416, at least one of the first and second processors 106 and 108 discards the IP packet and executes step 414.

Further, if, at step 406, the first processor 106 determines that the session template table 112 does not include the first session template entry 122a, the first processor 106 forwards the IP packet to the second processor 108. At step 418, the second processor 108 validates the IP packet. At step 420, the second processor 108 determines whether the filter rule table 114 includes the first filter rule entry 124a corresponding to the IP packet. If, at step 420, the second processor 108 determines that the filter rule table 114 does not include the first filter rule entry 124a, the second processor 108 executes step 416. If, at step 420, the second processor 108 determines that the filter rule table 114 includes the first filter rule entry 124a, the second processor 108 executes step 422. At step 422, the second processor 108 generates the first connection entry 126a corresponding to the IP packet and stores the first connection entry 126a in the session table 110 as the first session entry 120a and connection table 116. At step 424, the second processor 108 determines whether the connection template rule table 118 includes the first connection template rule entry 128a corresponding to the IP packet. If, at step 424, the second processor 108 determines that the connection template rule table 118 does not include the first connection template rule entry 128a, the second processor 108 executes step 412. If, at step 424, the second processor 108 determines that the connection template rule table 118 includes the first connection template rule entry 128a, the second processor 108 executes step 426. At step 426, the second processor 108 creates and stores the first session template entry 122a in the session template table 112. After step 426, the first processor 106 executes step 412.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for creating a session entry corresponding to an Internet protocol (IP) packet in a session table and forwarding the IP packet based on the session entry, wherein the IP packet includes a first set of fields, and the first set of fields includes a source IP address field, a destination IP address field, a source port field, a destination port field, and a protocol information field, the system comprising:
a first memory that stores the session table and a session template table;
a first processor in communication with the first memory, wherein the first processor is configured for:
receiving the IP packet;
determining whether the session table includes the session entry corresponding to the IP packet;

determining whether the session template table includes a session template entry corresponding to the IP packet when the session table does not include the session entry;

generating the session entry based on the IP packet and the session template entry when the session template table includes the session template entry;

storing the session entry in the session table; and forwarding the IP packet based on the session entry;

a second memory that stores a connection table, a connection template rule table, and a filter rule table, wherein the connection table, the connection template rule table, and the filter rule table include connection entries, connection template rule entries, and filter rule entries, respectively, and wherein the first processor is in communication with the second memory; and a second processor in communication with the first and second memories, wherein the second processor is configured for:

determining whether the filter rule table includes a filter rule entry corresponding to the IP packet when the session template table does not include the session template entry;

generating a connection entry corresponding to the IP packet when the filter rule table includes the filter rule entry;

storing the connection entry in the connection table;

storing the connection entry as the session entry in the session table;

determining whether the connection template rule table includes a connection template rule entry corresponding to the IP packet when the session template table does not include the session template entry;

generating the session template entry when the connection template rule table includes the connection template rule entry; and storing the session template entry in the session template table.

2. The system of claim 1, wherein the connection template rule entry includes a second set of fields, and the second set of fields includes a source IP address field, a destination IP address field, a destination port field, a protocol information field, a timeout field, and a maximum connection field.

3. The system of claim 2, wherein the second processor stores the session template entry in the session template table when at least one field of the second set of fields is equal to at least one corresponding field of the first set of fields.

4. The system of claim 2, wherein the session template entry includes a third set of fields, and wherein the third set of fields includes a source IP address field, a destination IP address field, a destination port field, a protocol information field, a timeout field, an action field, and a maximum connection field.

5. The system of claim 4, wherein the first processor generates the session entry based on the session template entry by concatenating at least one field of the third set of fields with the source port field of the first set of fields.

6. The system of claim 4, wherein the second processor replaces a value of the timeout field and a value of the maximum connection field of the third set of fields with a value of the timeout field and a value of the maximum connection field of the second set of fields, respectively, when the connection template rule table includes the connection template rule entry.

7. The system of claim 6, wherein the first processor deletes the session template entry from the session template table when at least one of the value of the timeout field of the third set of fields exceeds a first threshold value and the value of the maximum connection field of the third set of fields exceeds a second threshold value.

8. The system of claim 4, wherein the first processor at least one of forwards and discards the IP packet based on a value of the action field of the third set of fields, and wherein the second processor generates the value of the action field based on the first set of fields.

9. A method for creating a session entry corresponding to an Internet protocol (IP) packet and forwarding the IP packet based on the session entry by a system, wherein the system includes a first memory that stores session and session template tables, and a second memory that stores connection, connection template rule, and filter rule tables, the method comprising:

receiving the IP packet by a first processor;

determining whether the session table includes the session entry corresponding to the IP packet;

determining whether the session template table includes a session template entry corresponding to the IP packet when the session table does not include the session entry;

generating the session entry based on the IP packet and the session template entry when the session template table includes the session template entry;

storing the session entry in the session table;

forwarding the IP packet based on the session entry;

determining whether the filter rule table includes a filter rule entry corresponding to the IP packet when the session template table does not include the session template entry;

generating a connection entry corresponding to the IP packet when the filter rule table includes the filter rule entry;

storing the connection entry in the connection table;

storing the connection entry as the session entry in the session table;

determining whether the connection template rule table includes a connection template rule entry corresponding to the IP packet when the session template table does not include the session template entry;

generating the session template entry when the connection template rule table includes the connection template rule entry; and storing the session template entry in the session template table.

10. The method of claim 9, wherein the IP packet and the connection template rule entry include first and second sets of fields, respectively, and wherein the first set of fields includes a source IP address field, a destination IP address field, a source port field, a destination port field, and a protocol information field, and wherein the second set of fields includes a source IP address field, a destination IP address field, a destination port field, a protocol information field, a timeout field, and a maximum connection field.

11. The method of claim 10, wherein the session template entry is stored in the session template table when at least one field of the second set of fields is equal to at least one corresponding field of the first set of fields.

12. The method of claim 11, wherein the session template entry is stored in the session template table when the destination port and protocol information fields of the second set of fields are equal to the destination port and protocol information fields of the first set of fields, respectively.

13. The method of claim 10, wherein the session template entry includes a third set of fields, and wherein the third set of fields includes a source IP address field, a destination IP address field, a destination port field, a protocol information field, a timeout field, an action field, and a maximum connection field.

14. The method of claim 13, further comprises deleting the session template entry from the session template table when at least one of a value of the timeout field of the third set of fields exceeds a first threshold value and a value of the maximum connection field of the third set of fields exceeds a second threshold value.

15. The method of claim 13, wherein the step of generating the session entry based on the session template entry includes concatenating at least one field of the third set of fields with the source port field of the first set of fields.

16. The method of claim 13, wherein whether the session template table includes the session template entry is determined by comparing at least one field of the third set of fields with at least one corresponding field of the first set of fields.

17. The method of claim 16, wherein whether the session template table includes the session template entry is determined by comparing the source IP address field, the destination IP address field, the destination port field and the protocol information field of the third set of fields with the source IP address field, the destination IP address field, the destination port field, and the protocol information field of the first set of fields, respectively.

18. The method of claim 13, wherein the IP packet is at least one of forwarded and discarded based on a value of the action field of the third set of fields, and wherein the value of the action field is generated based on the first set of fields.

\* \* \* \* \*